United States Patent [19]

Nawata et al.

[11] Patent Number: 4,561,758
[45] Date of Patent: Dec. 31, 1985

[54] COPYING APPARATUS WITH FOCUS-ADJUSTING MECHANISM

[75] Inventors: Yoshiaki Nawata, Yokohama; Hideshi Oushiden, Kawasaki, both of Japan

[73] Assignee: Tokyo Shibaura Denki Kabushiki Kaisha, Kawasaki, Japan

[21] Appl. No.: 560,106

[22] Filed: Dec. 12, 1983

[30] Foreign Application Priority Data

Dec. 13, 1982 [JP] Japan ................. 57-218853

[51] Int. Cl.⁴ .................. G03G 15/04; G03B 27/34
[52] U.S. Cl. ................................ 355/8; 355/55
[58] Field of Search ............... 355/3 R, 8, 55, 57, 355/60

[56] References Cited

U.S. PATENT DOCUMENTS

| | | | |
|---|---|---|---|
| 3,946,222 | 3/1976 | Swanberg | 355/57 X |
| 4,268,165 | 5/1981 | Bradmon | 355/55 |
| 4,332,461 | 6/1982 | Cail et al. | 355/55 X |

FOREIGN PATENT DOCUMENTS 2259697 6/1973 Fed. Rep. of Germany .
3330007 2/1984 Fed. Rep. of Germany .
1339549 12/1973 United Kingdom .

*Primary Examiner*—Fred L. Braun
*Attorney, Agent, or Firm*—Cushman, Darby & Cushman

[57] ABSTRACT

A copying machine includes: a rotatable photoconductive drum and an optical assembly, having optical elements, for optically scanning a paper document, and forming an optical image corresponding to an optical document image on a photoconductive drum surface. The optical assembly includes: a lens; a first mirror section for introducing the image to the lens; and a second mirror section for introducing an optical image from the lens onto the drum. The position of the first mirror section relative to that of the second mirror section varies under mass production conditions although the relative positional relationship is preset in accordance with the inherent focal length of the lens. A focus adjusting device having DIP switches which are manually operated by an operator slightly moves the lens, the first mirror section and/or the second mirror section so as to eliminate positional errors in the optical assembly in accordance with the electrical data generated by the DIP switches, thereby compensating the out-of-focus state of the optical image on the drum surface.

12 Claims, 5 Drawing Figures

COPYING APPARATUS WITH FOCUS-ADJUSTING MECHANISM

BACKGROUND OF THE INVENTION

The present invention relates in general to a copying apparatus with a focus-adjusting mechanism and, more particularly, to an image copying machine for copying a paper image such as a document image, so as to print the image on paper.

For office workers dealing with increasing documentation, copying machines have been increasing their importance year by year. A total number of copying machines produced by various manufacturers is increasing. Along with this tendency, strict conditions for the manufacturing process of copying machines are imposed on the manufacturers so as to improve productivity while maintaining high quality standards.

In a conventional copying machine, an optical image obtained by light reflected by a paper document which is placed on a document scanning surface is incident on a lens through a first mirror. A document image from the lens is focused on a photoconductive drum through a second mirror. In order to clearly form the document image on the photoconductive drum with a high resolution and hence to improve the quality of the image to be copied, the optical system of the copying machine must be precisely controlled in accordance with the inherent focal length of the lens. When the copying machine of this type is manufactured in a factory, variations in optical characteristics (i.e., variations in focal length, etc.) of supposedly identical lenses, variations in component parts of the machine, and/or variations in the assembly process occur. As a result, during the manufacture of such copying machines, every optical system must be adjusted manually. The conventional adjustment process of such optical systems is cumbersome and time-consuming.

SUMMARY OF THE INVENTION

It is, therefore, an object of the present invention to provide a new and improved copying apparatus in which focusing adjustment can be easily and precisely performed so as to compensate for optical characteristic errors caused by variations in the manufacturing process.

According to the present invention, a copying machine comprises: a rotatable photoconductive drum; and an optical assembly, having a plurality of optical elements, for optically scanning an original such as a paper document, forming an optical image corresponding to an image of the original, and forming the optical image on a photoconductive surface of the photoconductive drum. The optical assembly has: a lens; a first mirror section for introducing the optical image of the paper document to the lens; and a second mirror section for introducing an optical image from the lens onto the photoconductive surface of the photoconductive drum. The positions of the lens, the first mirror section, and the second mirror section varies under mass production conditions although the relative positional relationship is preset in accordance with the inherent focal length of the lens. A focus adjusting device is provided which includes electrical devices which are manually operated by an operator and which generate electrical data in accordance with the manual operation. The focus adjusting device slightly moves the lens, the first mirror section and/or the second mirror section so as to eliminate positional errors in the optical assembly in accordance with the electrical data, thereby compensating an out-of-focus state of the optical image on the photoconductive surface, the out-of-focus state being caused by positional errors of the optical elements.

BRIEF DESCRIPTION OF THE DRAWINGS

The present invention can best be understood by reference to the accompanying drawings, in which.

DETAILED DESCRIPTION OF THE PREFERRED EMBODIMENT

Figure 1:
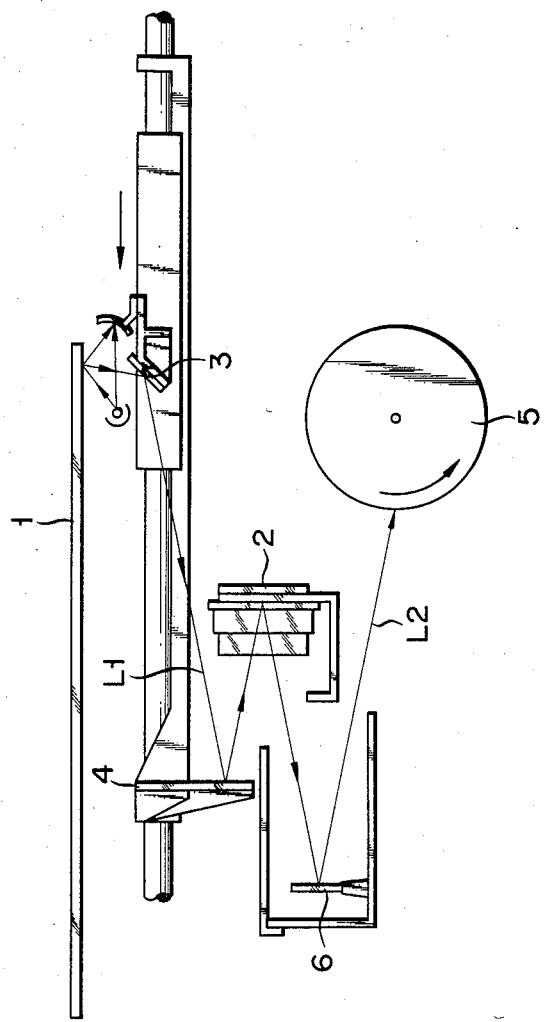
FIG. 1 is a diagram showing an optical system of a conventional copying machine so as to explain the conventional focus adjustment technique.

In order to best understand the present invention, the conventional focus adjusting technique will be described with reference to FIG. 1 before a preferred embodiment of the present invention is described.

Conventional focus adjustment is performed in a copying apparatus such as a fixed document-table type electronic copying machine as follows. An optical path length L1, equal to a sum of a distance between a document scanning surface 1 and a first mirror 3, a distance between the first mirror 3 and a second mirror 4 moved relative to the first mirror at a speed half that of the first mirror 3, and a distance between the second mirror 4 and a lens 2, is adjusted to be equal to an optical path length L2, equal to a sum of a distance between a photoconductive drum 5 and a third mirror 6 and a distance between the third mirror 6 and the lens 2, so that the document image can be clearly formed on the photoconductive drum 5. In general, when electronic copying machines are manufactured on a mass production line, the optical path lengths vary in accordance with variations in focal lengths of the lenses 2, variations in the manufacture of other component parts, and variations in the assembly process. Therefore, individual copying machines must be manually adjusted. For example, in the electronic copying machine shown in FIG. 1, in order to determine the optical path length L2 between the lens 2 and the photoconductive drum 5 in accordance with the focal length of the lens 2, the position of the third mirror 6 is mechanically and manually moved by inserting a position adjustment member such as a spacer (not shown) between the third mirror 6 and the fixing portion thereof. Thereafter, the position of the first mirror 3 is changed with respect to the position of the second mirror 4 so as to finally equalize the optical path length L1 between the document scanning surface 1 and the lens 2 with the optical path length L2.

However, the conventional focus adjusting technique described above has the following drawbacks. In the portion from the lens 2 to the photoconductive drum 5 which includes the third mirror 6 and which is built into the inside of the electronic copying machine housing, the third mirror 6 is not accessible to the operator. Furthermore, the focal lengths of the lenses 2 vary for individual copying machines. The positions of the third mirrors 6 of copying machines of the same type must be adjusted, respectively. In addition to these disadvantages, the required thickness of the spacer between the third mirror 6 and the fixing portion thereof cannot be specified, except by repeated trial-and-error. Thereafter, when the position of the first mirror 3 is moved, a carriage clamp (not shown) held by a drive wire (not shown) and fixing the first mirror 3 must be moved in accordance with the experience of a fitter. As a result, an artificial error is caused by such adjustment by the fitter. In this manner, the conventional adjusting technique is time-consuming and cumbersome and cannot provide high precision.

Figure 2:
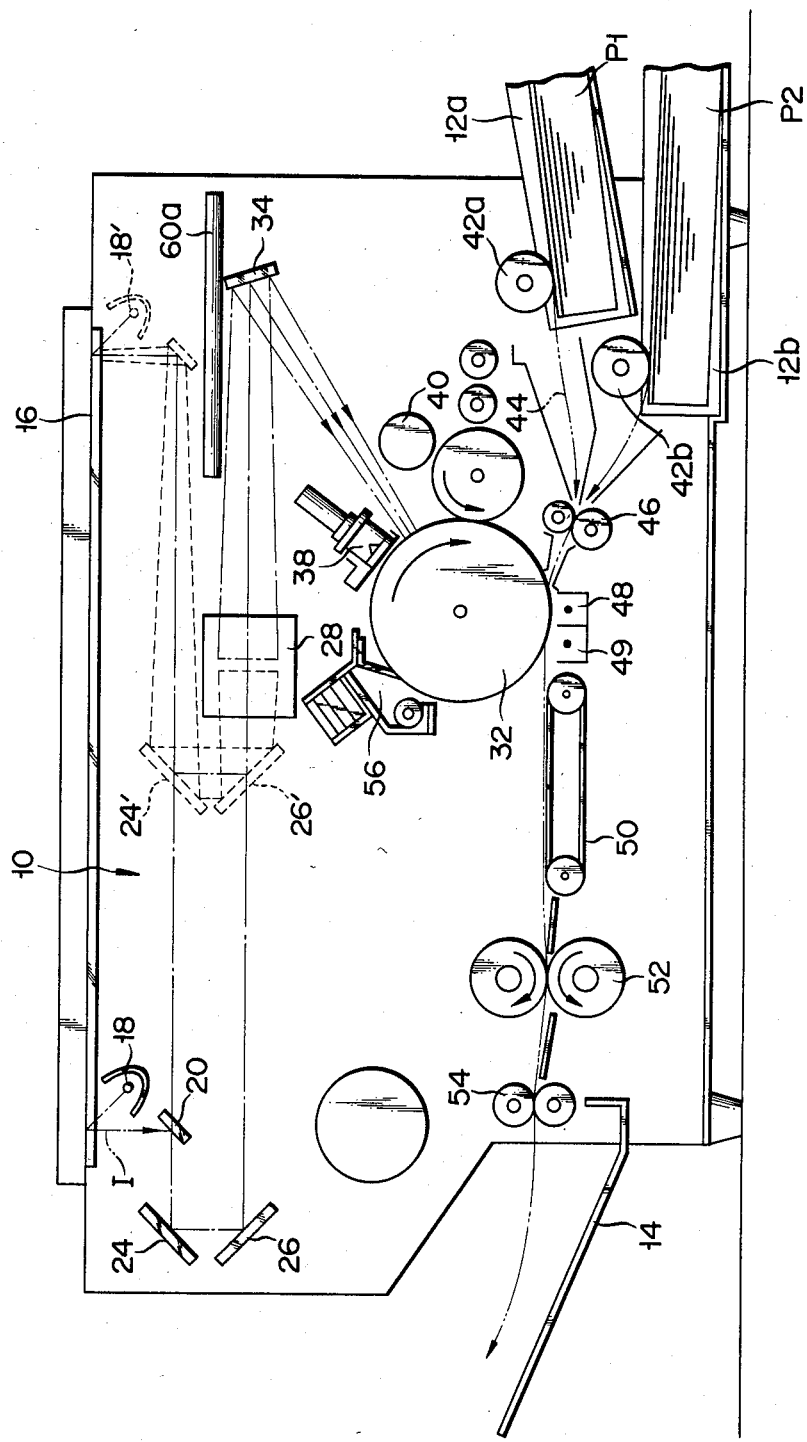
FIG. 2 is a diagram schematically illustrating the entire construction of an electronic copying machine according to an embodiment of the present invention.

The conventional problems described above can be overcome by the preferred embodiment to be described below. In an electronic copying machine shown in FIG. 2, reference numeral 10 represents a machine housing. Two paper cassettes 12a and 12b for storing copying paper sheets P1 and P2 having predetermined sizes are detachably mounted in the machine housing 10. A tray 14 is detachably mounted in the same manner as the paper cassettes 12a and 12b at a portion at an opposite side from the side at which the cassettes 12a and 12b are mounted. The tray 14 stores paper sheets which are finished copies and have been discharged from the machine.

A document table 16 is fixed on the upper portion of the housing 10. An original such as a paper document (not shown) placed on the document table 16 is scanned with light from a lamp 18 of a linearly movable light source. The lamp 18 is driven by a scanning motor 22 (FIG. 3) comprising a pulse motor such that the lamp 18 together with a first mirror 20 reciprocates in a direction parallel to the fixed document table 16 along the longitudinal direction of the machine housing 10. (The maximum movable range of the lamp 18 is preset in accordance with the length of the document table 16; the leftmost lamp position is indicated by a solid line and the rightmost lamp position is indicated by a dotted line in FIG. 2.) The document scanning light is reflected by the first mirror 20 and is eventually incident on a lens 28 after reflection at second and third mirrors 24 and 26. While the lamp 18 and the first mirror 20 are being moved, (since a wire 72 clamped by a member and pulleys 70 constitute a running block as described later,) the second and third mirrors 24 and 26 are driven by a mirror drive motor 30 (see FIG. 3 or 4) comprising a pulse motor, and reciprocate linearly at a speed half that of the lamp 18, thereby keeping the optical path length L1 between the lamp 18 and the lens 28 constant. The first pair of optical elements comprising the lamp 18 and the first mirror 20 and the second pair of optical elements comprising the second and third mirrors 24 and 26 reciprocate and are synchronized with the rotation of a photoconductive drum 32 onto which the document image thus scanned is formed. The paper document placed on the document table 16 is illuminated by light from the moving lamp 18, so that the optical image thereof is introduced to the lens 28 through the mirrors 20, 24 and 26. The optical image from the lens 28 is reflected by a fixed fourth mirror 34 and is formed on the surface of the rotating photoconductive drum 32.

A charger 38 is disposed in the vicinity of the drum 32 in the machine housing 10. When the drum 32 is charged by the charger 38, a latent image corresponding to the optical document image is formed on the surface of the photoconductive drum 32. The latent image on the drum 32 is developed by a developing unit 40 which is brought into rotatable contact with the drum 32. Meanwhile, the copy paper sheets P1 picked up from one of the paper cassettes (e.g., 12a) by a corresponding pickup roller 42a one at a time are guided below the photoconductive drum 32 by a pair of resist rollers 46 in the direction indicated by an arrow 44. Thereafter, a toner is applied to the paper sheet P1 by a transfer charger 48 in accordance with the technique of image formation by development, thereby transferring the document image to the paper sheet P1. This paper sheet P1 is peeled from the drum 32 by a peeling charger 49 and then guided to a fusing or fixing unit 52 along a conveyor belt 50. The document image is then fixed, and the copied paper sheet is then discharged by discharge rollers 54 into the tray 14. After completion of the transfer operation the photoconductive surface of the drum 32 is discharged and cleaned by a cleaner 56 disposed in the vicinity thereof. The drum 32 is then restored to its initial angular position.

The focus-adjusting mechanism together with an exposure unit built into the electronic copying machine will be described with reference to FIGS. 3 and 4.

It should be noted that the exposure unit comprises an optical system wherein a uniform scanning light irradiates a document placed on the document table 16 through the lamp 18 and the reflected light is focused on the surface of the photoconductive drum 32 through the lens 28 and the first to fourth mirrors 20, 24, 26 and 34.

Figure 3:
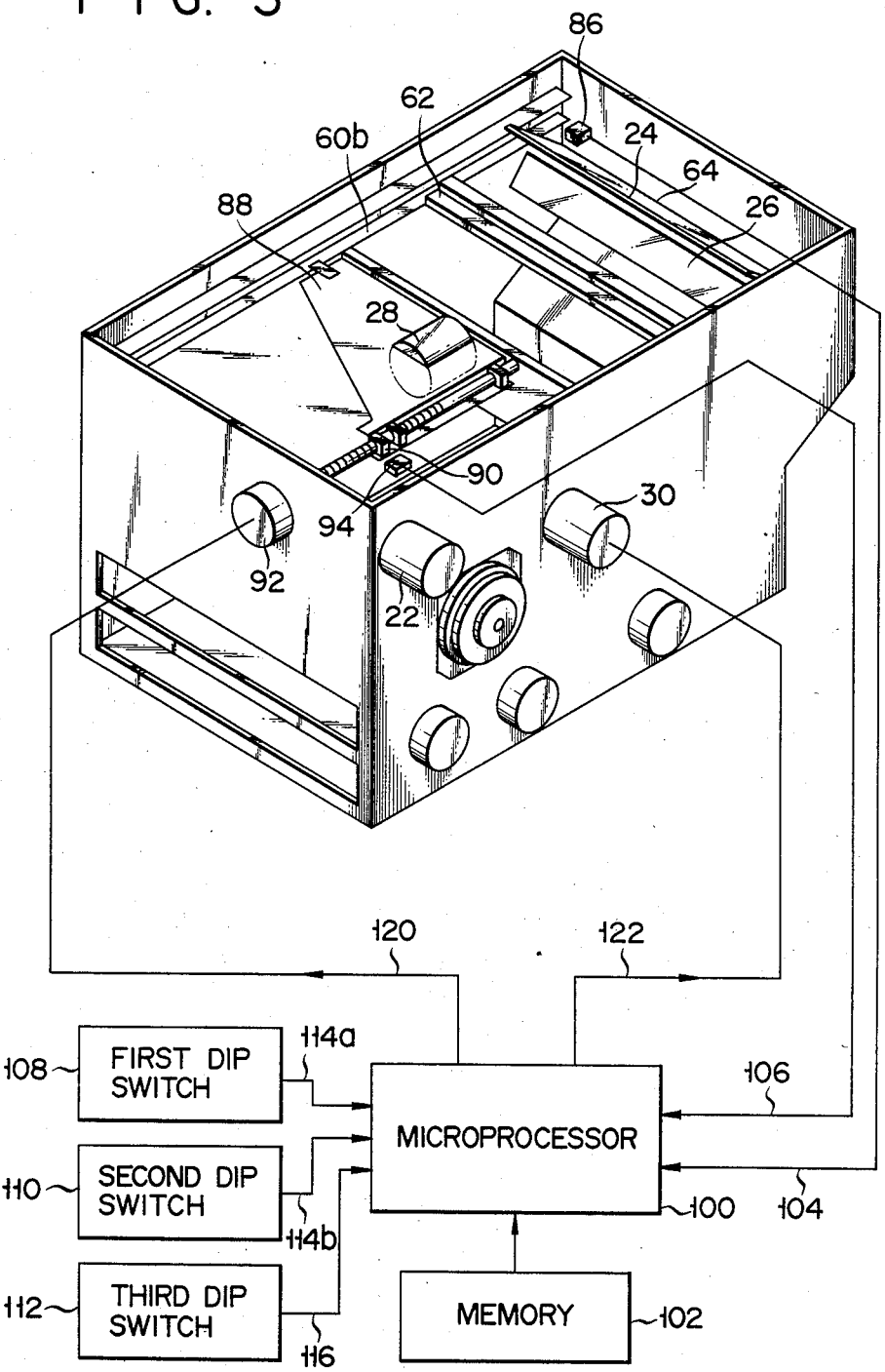
FIG. 3 is a schematic view illustrating a focus adjusting section built into the machine shown in FIG. 2 and an associated main part of the machine.
Figure 4:
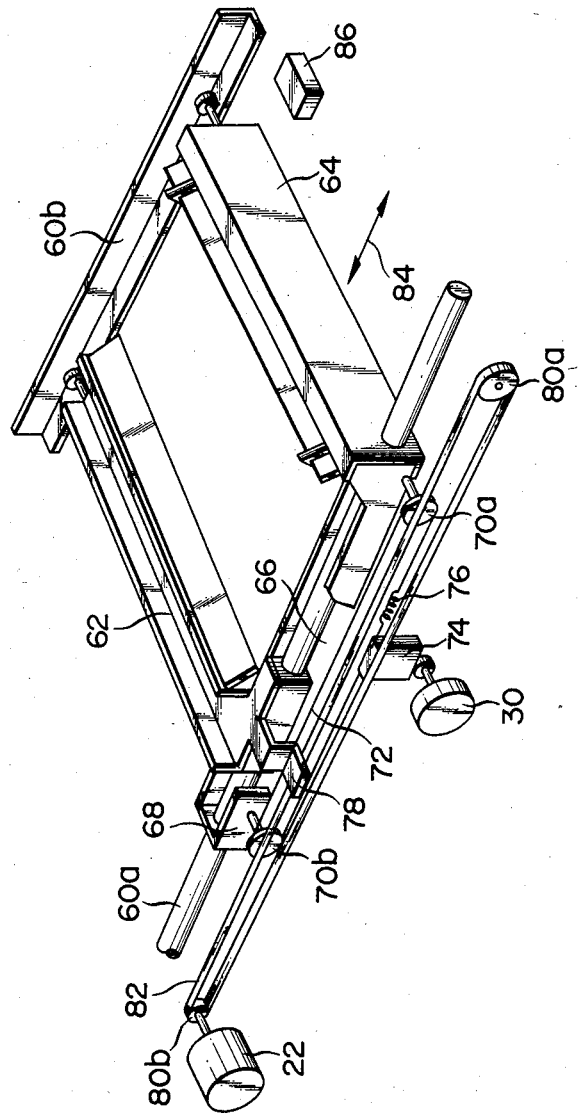
FIG. 4 is a partial perspective view illustrating the construction of the main part of the copying machine (FIG. 2) when viewed from a different angle from that in FIG. 3.
Figure 5:
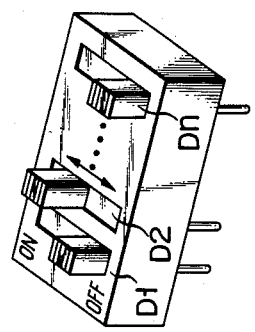
FIG. 5 is a perspective view illustrating DIP switches connected to a microprocessor shown in FIG. 3.

Referring to FIGS. 3 and 4, reference numerals 60a and 60b designate a pair of carriage guide rails which are mounted parallel to each other in the electronic copying machine housing 10. One end of each of first and second carriages 62 and 64 is fitted around the carriage guide rail 60a to reciprocate therealong. A guide roller at the other end of each of the first and second carriages 62 and 64 is mounted in the carriage guide rail 60b to roll therein. The lamp 18 and the first mirror 20 are mounted on the first carriage 62, and the second mirror 24 and the third mirror 26 are mounted on the second carriage 64. Light from the lamp 18 irradiates the document placed on the document table 16, and reflected light is incident on the lens 28 through the first and second mirrors 24 and 26. A slider 68 as a power transmission mechanism for moving the first and second carriages 62 and 64 is mounted on the second carriage 64 through a connecting arm 66. The slider 68 is movably fitted around the carriage guide rail 60a. A pair of pulleys 70a and 70b are rotatably mounted on the outer side of the slider 68 and the side portion of the second carriage 64, respectively. A timing wire 72 is looped around the pulleys 70a and 70b. One end of the timing wire 72 is fixed directly to a first fixing portion 74, and the other end thereof is fixed to the first fixing portion 74 through a spring 76. An intermediate portion of the timing wire 72 is clamped to a second fixing portion 78 mounted on the first carriage 62. Therefore, the pulleys 70a and 70b serve as rollers. The second fixing portion 78 on the first carriage 62 is coupled to a toothed belt 82 looped between a driven pulley 80a and a drive pulley 80b driven by the scanning motor 22. Therefore, when the scanning motor 22 is driven, the second carriage 64 is moved at a speed half that of the first carriage 62. The first fixing portion 74 is coupled to the mirror drive motor 30 through a gear. When the mirror drive motor 30 is driven, only the second carriage 64 reciprocates in the directions indicated by arrows 84 in FIG. 4.

Referring to FIGS. 3 and 4, reference numeral 86 denotes a first microswitch arranged to detect the initial position of the second carriage 64.

As shown in FIG. 3, the lens 28 is held in a lens block 88 mounted in and reciprocating along the carriage guide rails 60a and 60b. The lens block 88 is coupled to a lens drive motor 92 through a cam follower 90 mounted on the lens block 88. The lens block 88 reciprocates upon rotation of the lens drive motor 92 in accordance with the drive direction thereof. Referring to FIG. 3, reference numeral 94 designates a second microswitch arranged to detect the initial position of the lens block 88.

The mirror drive motor 30 and the lens drive motor 92 preferably comprise pulse motors so as to accurately control the displacement of the first carriage 62, the second carriage 64 and the lens 28.

Referring to FIG. 3, the optical focus adjusting unit includes an operation control device comprising a microprocessor 100. The first and second microswitches (or position detectors) 86 and 94 are connected to the microprocessor 100. A memory 102 is connected to the microprocessor 100 and prestores software for defining the control operation algorithm and preset displacement data (representing displacement of the components 28 and 24 and 26 from the reference points or origins respectively determined by the position detectors 94 and 86 to the desired positions when the copying machine is powered). The first microswitch or mirror position detector 86 is fixed in the machine housing 10 at the reference point (origin) of the second movable carriage 64 on which the mirrors 24 and 26 are mounted. When the second carriage 64 moves and is brought into contact with the detector 86, the detector 86 detects that the second and third mirrors 24 and 26 have reached the reference position, and the detector 86 generates a mirror position detection signal 104. The second microswitch or lens position detector 94 is fixed at the reference point (origin) of the movable lens block 88 on which the lens 28 is mounted. When the lens block 88 is brought into contact with the detector 94, the detector 94 detects that the lens 28 has reached the reference position. The detector 94 then generates a lens position detection signal 106. The detection signals 104 and 106 are supplied to the microprocessor 100.

A plurality of fixed-position switches (e.g., DIP or dual-in-line package switches) 108, 110 and 112 manually operated by an operator, such as a factory worker or service engineer, are connected to the microprocessor 100. These switches 108, 110 and 112 are preferably arranged in proper positions accessible to the operator in the machine housing 10. The first DIP switch 108 is set by the operator and supplies to the microprocessor 100 first displacement data 114a which digitally represents a displacement for fine-adjusting the position of the lens block 88 in accordance with the inherent focal length of the lens 28. The second DIP switch 110 is preset by the operator and supplies to the microprocessor 100 second displacement data 114b which digitally represents a minute displacement (in the unit of 1/10 that of the data 114a) of the lens block 88. The third DIP switch 112 is operated by the operator and supplies to the microprocessor 100 mirror displacement data 116 which digitally represents a displacement for fine-adjusting the position of the second carriage 64 which has the lenses 24 and 26 mounted thereon. The microprocessor 100 controls the mirror drive motor 30 and the lens drive motor 92 so as to properly fine-adjust the positions of second carriage 64 and the lens block 88 in response to the preset displacement data 114a, 114b and 116.

It should be noted that each DIP switch has a predetermined number of digit switch components D1, D2, . . . and Dn arranged in parallel with each other to generate a digital output signal having a predetermined number of bits. Each digit switch D is manually switched by the operator so as to selectively generate a digital value 0 or 1 ("L" or "H"). The DIP switch of this type is described, for example, in John B. Peatman, "Microcomputer-Based Design", McGraw-Hill Kogakusha, Ltd., (1977), pp. 229-231.

The focus adjusting operation of the electronic copying machine according to this embodiment of the present invention can be performed in the factory where the copying machines are mass-produced. When the main power switch (not shown) of the machine is turned on, the mirror drive motor 30 and the lens drive motor 92 are rendered operative, so that the second carriage 64 having the mirrors 24 and 26 thereon and the lens block 88 having the lens 28 thereon are moved toward reference positions which are defined by the detectors (microswitches) 86 and 94, respectively. When the carriage 64 and the lens block 88 are brought into contact with the detectors 86 and 94, the detectors 86 and 94 generate the detection signals 104 and 106, respectively. The signals 104 and 106 are supplied to the microprocessor 100. The microprocessor 100 then determines that the lens 28 and the mirrors 24 and 26 have reached the reference positions, respectively.

The microprocessor 100 reads out the prestored design displacement data from the memory 102 so as to move the lens block 88 and the carriage 64 by distances l1 and l2 from the corresponding reference positions in accordance with the readout data, thereby respectively positioning the components 88 and 64 in the copy start position. The data of distances l1 and l2 can be prestored in the memory 102. The optical characteristics including the focal length of the lens 28 mounted on the lens block 88 are predetermined at the time of machine design, and are known. In order to accurately focus the optical image on the drum 32, the optical path length L1 from the document scanning surface of the document table 16 to the lens 28 through the first to third mirrors 20, 24 and 26 is required to be equal to the second optical path length L2 from the lens 28 to the surface of the photoconductive drum 32 through the fourth mirror 34. In order to position the lens block 88 and the carriage 64 in the respective copy start positions, the distance data l1 and l2 between the reference positions (defined by the detectors 86 and 94, respectively) and proper positions are determined at the time of design. From a theoretical point of view, the optical image obtained by scanning the document must be accurately focused on the surface of the photoconductive drum 32 in accordance with the inherent focal length of the lens 28. However, in practice, variations in optical characteristics such as focal lengths of supposedly identical lenses, variations in component parts of the machine, and/or variations in the assembly process are inevitable and cannot be prevented. As a result, an out-of-focus state occurs on the photoconductive drum 32. In order to compensate for the out-of-focus state, the operator, such as a factory worker, properly and manually sets the minute displacements 11 and 12 of the lens 28 and the mirrors 24 and 26 by using the first to third DIP switches 108, 110 and 112, while visually observing and checking the out-of-focus state of the optical image on the actual photoconductive drum 32 in accordance with a trial-and-error procedure.

In order to fine-adjust the position of the lens 28, the operator can adjust the two DIP switches 108 and 110. The displacement set by the second DIP switch 110 is more precise than that set by the first DIP switch 108, so that the operator can fine-adjust the position of the lens 28 in accordance with the switches 108 and 110. The data 114a and 114b from these switches 108 and 110 are supplied to the microprocessor 100, and a control signal 120 is supplied to the lens drive motor 92 under the control of the microprocessor 100. The motor 92 starts rotation in response to the signal 120 so that the lens block 88 is driven so as to move the lens 28 by the distance corresponding to the data 114a and 114b. The data 116 generated from the third DIP switch 112 for fine-adjusting the mirror position is also supplied to the microprocessor 100. Therefore, the mirror drive motor 30 drives the second carriage 64 which has the mirrors 24 and 26 mounted thereon, in response to another control signal 122. As a result, the lens 28 mounted on the lens block 88 and the mirror section mounted on the second carriage 64 are positioned in the optimum copy start positions so as to obtain a clear image on the photoconductive drum 32. In this manner, focus adjustment is completed.

According to the present invention, variations in the focal points of the image formation elements, and the variations in the optical path length between the photoconductive surface and the lens relative to the optical path length between the lens and the document surface can be corrected by using the DIP switches 108, 110 and 112. Unlike the conventional machine wherein focus adjustment must be performed at a place inaccessible to the operator, the copying machine eliminates such difficulties. According to the present invention, the focus adjustment can be performed by simply adjusting the external switches. Furthermore, this does not rely on manual adjustment, thereby eliminating differences introduced by individual fitters. As a result, the factory focus adjustment procedure during the mass-production manufacturing process can be improved.

Although the present invention has been shown and described with respect to a particular embodiment, various changes and modifications which are obvious to a person skilled in the art to which the invention pertains are deemed to lie within the spirit and scope of the invention.

In the above embodiment, pulse motors are used as the lens drive motor and the mirror drive motor. However, a timing disk may be mounted on a servo motor shaft and a desired displacement can be obtained by counting the number of rotations of the motor shaft.

The displacement of the lens block can be achieved by one of two switches SW1 or SW2. When the DIP switch is used, the number of bits of each DIP switch may be changed in accordance with the required precision of the displacement.

What is claimed is:

1. A copying machine comprising:
    (a) a rotatable photoconductive drum having a photoconductive surface;
    (b) optical means, having a plurality of optical elements, for optically scanning an original such as a paper document to form an optical image corresponding to a document image and for forming the optical image on the photoconductive surface of said photoconductive drum, said optical means comprising, as said optical elements,
        lens means having an inherent focal length characteristic,
        first mirror means for introducing the optical image of the paper document to said lens means, and
        second mirror means for introducing the optical image from said lens means onto the photoconductive surface of said photoconductive drum, a relative positional relationship between said first and second mirror means having a variation caused by mass production even if the relative positional relationship is properly set in accordance with the inherent focal length characteristic; and
    (c) focus adjusting means, including electrical devices manually operated by an operator and producing electrical digital distance data representing displacement determined by the operator, which is produced in accordance with the manual operation by the operator, for slightly moving at least one of said lens means, said first mirror means and said second mirror means in accordance with the electrical digital distance data so as to eliminate positional variations in said optical means, thereby compensating an out-of-focus state of the optical image on the photoconductive drum surface, said out-of-focus state being caused by the positional variations.

2. The copying machine according to claim 1, wherein said focus adjusting means equalizes a first actual optical path length between a scanning surface of the paper document and said lens means through said first mirror means with a second actual optical path length between said lens means and the photoconductive drum surface through said second mirror means so as to optimally focus the optical image on the photoconductive drum surface.

3. The copying machine according to claim 2, wherein said focus adjusting means comprises:
    microcomputer means, connected to said electrical devices, for computing a displacement of at least one of said optical elements in accordance with the electrical digital distance data; and
    electrical driving means, connected to said at least one of said optical elements and said microcomputer means, for linearly moving said at least one of said optical elements under the control of said microcomputer means.

4. The copying machine according to claim 3, wherein said electrical devices comprise DIP switches, manually operated by the operator, for directly supplying to said microcomputer means said electrical digital distance data which is input by the operator to digitally represent at least one of displacements of said lens means and said first and second mirror means, said at least one of the displacements being required to compensate the out-of-focus state due to the positional variations in said optical means.

5. The copying machine according to claim 4, wherein said electrical driving means includes pulse motors independently arranged to drive said lens means and said first mirror means, respectively.

6. The copying machine according to claim 5, wherein said DIP switches include a plurality of DIP switches having different preset ranges so as to precisely set the displacement of said at least one of said optical elements, the displacement being required to adjust the focal point of the optical image on said photoconductive surface.

7. The copying machine according to claim 2, wherein said focus adjusting means comprises:
position-detecting means, arranged at first and second reference positions with respect to said lens means and said first mirror means, for generating first and second detection signals when said lens means and said first mirror means are positioned in the first and second reference positions, respectively; and
means, connected to said electrical devices and said position-detecting means, for moving said lens means and said first mirror means toward the first and second reference positions when said machine is energized, for stopping said lens means and said first mirror means when said detection signals are received, and for automatically moving said lens means and said first mirror means with respect to the first and second reference positions so as to position said lens means and said first mirror means in proper copy start positions determined in accordance with the focal length characteristic.

8. The copying machine according to claim 7, wherein said focus adjusting means further comprises:
memory means, connected to said means, for prestoring first and second distance data for moving said lens means and said first mirror means from the first and second reference positions to the copy start positions, respectively, said first and second distance data being preset in accordance with the lens focal length characteristic.

9. The copying machine according to claim 8, wherein said focus adjusting means comprises:
microcomputer means, connected to said electrical devices, for computing a displacement of at least one of said optical elements in accordance with the electrical digital distance data; and
electrical driving means, connected to said at least one of said optical elements and said microcomputer means, for linearly moving said at least one of said optical elements under the control of said microcomputer means.

10. The copying machine according to claim 9, wherein said electrical devices comprise DIP switches, manually operated by the operator, for directly supplying to said microcomputer means said electrical digital distance data which is input by the operator to digitally represent at least one of displacements of said lens means and said first and second mirror means, said at least one of the displacements being required to compensate the out-of-focus state due to the positional variations in said optical means.

11. The copying machine according to claim 10, wherein said electrical driving means includes pulse motors independently arranged to drive said lens means and said first mirror means, respectively.

12. The copying machine according to claim 11, wherein said DIP switches include a plurality of DIP switches having different preset ranges so as to precisely set the displacement of said at least one of said optical elements, the displacement being required to adjust the focal point of the optical image on the photoconductive surface of said drum.

* * * * *